United States Patent [19]
Rynne et al.

[11] Patent Number: 5,826,653
[45] Date of Patent: Oct. 27, 1998

[54] PHASED ARRAY APPROACH TO RETRIEVE GASES, LIQUIDS, OR SOLIDS FROM SUBAQUEOUS GEOLOGIC OR MAN-MADE FORMATIONS

[75] Inventors: Timothy M. Rynne, Long Beach; John F. Spadaro, Huntington Beach; Joe L. Iovenitti, Pleasant Hill; John P. Dering, Lakewood; Donald G. Hill, Walnut Creek, all of Calif.

[73] Assignee: Scientific Applications & Research Associates, Inc., Huntington Beach, Calif.

[21] Appl. No.: 691,602

[22] Filed: Aug. 2, 1996

[51] Int. Cl.$^6$ .............................. B09C 1/00; E21B 43/25; E21B 43/30
[52] U.S. Cl. ...................... 166/245; 166/177.1; 166/249; 210/747; 299/4; 405/128
[58] Field of Search .............................. 166/177.1, 177.2, 166/177.6, 245, 249, 254.1; 210/170, 747; 299/4, 14; 405/128

[56] References Cited

U.S. PATENT DOCUMENTS

| | | | |
|---|---|---|---|
| 2,871,944 | 2/1959 | Pleuger | 166/249 |
| 3,497,005 | 2/1970 | Pelopsky et al. | 166/249 X |
| 4,280,558 | 7/1981 | Bodine | 166/245 |
| 4,417,621 | 11/1983 | Medlin et al. | 166/249 |
| 4,648,449 | 3/1987 | Harrison | 166/249 |
| 5,147,535 | 9/1992 | Bernhardt | 166/177.6 X |
| 5,396,955 | 3/1995 | Howlett | 166/177.1 |
| 5,460,223 | 10/1995 | Economides | 166/249 |
| 5,597,265 | 1/1997 | Gallo | 210/747 X |
| 5,628,365 | 5/1997 | Belonenko | 166/249 |

*Primary Examiner*—George A. Suchfield
*Attorney, Agent, or Firm*—John J. Murphey

[57] ABSTRACT

A method of enhancing the remediation of contaminated soils and ground water, production of oil and gas, and production of any solid, gas, and/or liquid from subsurface geologic and man-made formations including the steps of estimating the geometric boundaries of the region containing the material to be recovered, drilling a recovery well(s) into subsurface in a strategic location to recover the material of interest, establishing multiple sources of acoustical power in an array about and spaced-apart from the surface or at various depths below the surface in a borehole(s) and/or well(s), directing a volume of acoustical excitation from the sources into the region containing the material to be recovered, the excitation in the form of either controllable sinusoidal, square, pulsed, or various combinations of these three waveforms, and controlling the phasing, frequency, power, duration, and direction of these waveforms from the sources to increase and control the intensity of acoustical excitation in the region of the material to be recovered to enhance. the recovery of said material from the recovery well(s). The invention will augment any technology affecting the removal of materials from the subsurface.

13 Claims, 4 Drawing Sheets

PHASED ARRAY APPROACH TO RETRIEVE GASES, LIQUIDS, OR SOLIDS FROM SUBAQUEOUS GEOLOGIC OR MAN-MADE FORMATIONS

BACKGROUND OF THE INVENTION

1. Field of the Invention

This invention pertains to the science and engineering of removing gas, fluid and solids from subsurface geologic and/or man-made formation(s) or units (herein referred to as Formation). This invention is applicable to the fields of oil and gas production, environmental remediation of contaminated soil and ground water including but not limited to fuel and chlorinated hydrocarbons; radionuclides; metals and pesticides; solution mining, water resources production, and the subsurface recovery of any other recoverable substance both natural and man-made. The invention concerns a method of introducing acoustical energy into the Formation containing the recoverable substance(s) to aid in removing said material through extraction, recovery, or production well(s) placed within the region of the material to be recovered (herein referred to as Target Volume). The invention will augment any technology affecting the removal of material from the subsurface.

2. Description of the Prior Art

Historically, liquids and gasses have been removed from the earth by drilling wells into fertile Formations, occasionally cracking or fracturing the surrounding rock and/or soil with a variety of techniques, including but not limited to explosives, and then allowing the internal pressure of the Formation to drive the products into one or more extraction wells drilled into the Formation. When the Formation has been stripped of its recoverable products, through the aforementioned primary production technique, secondary and tertiary recovery methodologies, such as injecting water and steam under pressure into the Formation, have been used to aid in removing additional material.

In addition to extracting virgin materials from the earth, there has recently been developed the practice of remediating contaminated soil and ground water by either extracting the gaseous, liquid, and/or solid contaminants through similar types of extraction wells or through in-situ destruction or immobilization of the contaminants. The contamination may come from a variety of sources such as leaking underground fuel tanks or chemical contaminants spilled on the ground that percolate down into subsurface or subaqueous areas. Unfortunately, many of these contaminants become bound up in Formations, by surface tension or other physical or chemical processes, and are difficult to recover.

Seismic excitation has been used to enhance the recovery of materials from subsurface and subaqueous Formations and the wells drilled into them. For instance, in U.S. Pat. No. 3,970,146, there is disclosed the sonic cleaning of wells by dipping a sonic generator into the liquid at the base of a well casing to generate seismic energy and create new fissures to break up tars and other materials that have been deposited in the casing during previous recovery operations.

In U.S. Pat. No. 4,280,558 there is disclosed a technique of drilling a pair of spaced-apart casings into an oil bearing Formation and then sinking a series of piling members into the same Formation on a line between the casings and thereafter applying sonic energy to the casings to create a flow of water that will capture oil entrained in the Formation for recovery via the other casing.

In U.S. Pat. No. 4,417,621, there is disclosed a system whereby a pair of casings are driven into a Formation, in spaced-apart arrangement, and a flow of gas, such as carbon dioxide, is introduced into one casing for percolation into the surrounding Formation, and where low amplitude seismic vibrations are injected at the surface of the ground, between the two casings, to aid in breaking up the recoverable oil for capture by the gas and recovery via the other casing.

In U.S. Pat. No. 5,184,678, there is disclosed a method and apparatus for stimulating fluid production in a producing well. wherein a well stimulating tool is passed into the well casing and an acoustic transducer mounted in a pool of liquid inside the tool is energized to produce vibrations that pass from the liquid through. the casing into the surrounding Formation to reduce the viscosity of the fluids in the Formation for later recovery.

In all these prior art practices, the use of seismic, sonic, or acoustic excitation is radially broadcasted, except for U.S. Pat. No. 4,280,558 where it is trapped somewhat in a linear array by virtue of a plurality of sonic pump stations that are sunk or drilled in a line between the casing injecting the water and the casing receiving the mixture of oil and water. Other than planting a plurality of sonic pumps in a physical line, from source casing to recovery casing, the sonic energy is rapidly dissipated in an ever-broadening circle moving away from the source, making this method of sonic excitation very inefficient.

SUMMARY OF THE INVENTION

This invention is an efficient method of using acoustic or sonic excitation. This first step in the method is to estimate the boundaries of either the materials to be recovered within the Formation or the volume of soil and/or rock in the Target volume. This can be accomplished by conventional site survey techniques.

The next step involves drilling a recovery well or wells in the Formation to withdraw the materials to be recovered after they have been released or liberated from the natural forces, i.e., surface tension or molecular binding, holding them within the Formation.

The next step is to place a number of sonic sources about the recovery well(s), in some relation to the geometry of the Target Volume. These sonic sources can be surface mounted, as shown in U.S. Pat. No 4,417,621, or be subsurface mounted, as shown in U.S. Pat. No. 3,970,146, or be a combination of surface-mounting and subsurface mounting, as shown in U.S. Pat. No. 4,280,558. This is known as an "array" and generally may take the form of a ring or a spot-pattern, as it is known in the oil industry, within and surrounding the Target Volume.

The next step is to begin to broadcast sonic energy in the form of some combination of sinusoidal, square, and/or pulsed waves of energy that are directed from the sources toward the Target volume. The sonic power is controlled in phase, power, duration, and direction to interact with the beams from adjacent and other placed sources so that they are reinforced and reinforce each other. In this manner, the intensity can also be made more efficient because it can be focused into either radial reinforcing beams, focused into sweeping linear beams, or a combination of radial and linear beams over the Target Volume. Pockets of reinforced radiation, produces by the reinforcing aspects of the phased energy, can be used to affect the processes that retain the materials to be recovered in the Formation. Recovery can be enhanced with the use of water, steam, gas, fuel, surfactants, heat, or the like as is known in the prior art.

Accordingly, the main object of this invention is a method of increasing the efficiency of sonic energy broadcast into the subsurface and into the Target Volume to affect or break down the forces that retain the material to be recovered in the Formations to allow removal of the material(s) through recovery techniques such as but not limited to recovery well(s) or trenches. Other objects of the invention include a method that is closely focusable to Target Volumes so that effects of the sonic radiation are confined to a localized area and away from places where it could bring harm to persons, structures, fauna and flora; a method that utilizes relatively small amounts of sonic energy to create gross changes in underground processes so as to allow quick and efficient recovery of materials such as, but not limited to, gas, oil and contaminants from areas where present technology is wanting; a method of using a rather small amount of equipment to achieve a rather large change in the earth to recover materials that heretofore were considered not feasibly.

These and other objects of the invention can be more clearly perceived by reading the following Description of the Preferred Embodiments taken together with the drawings appended hereto. The protection sought by the inventors can be gleaned from a fair reading of the claims that conclude this specification.

DESCRIPTION OF THE PREFERRED EMBODIMENT

The following description of this invention is directed toward recovering gases, liquids, and/or solids from the earth. This is not to be taken as limiting the invention in any way. This invention finds use in the recovery of virgin minerals, such as, oil, gas, metals, as well as contaminants and other substances both natural and man-made.

Figure 1:
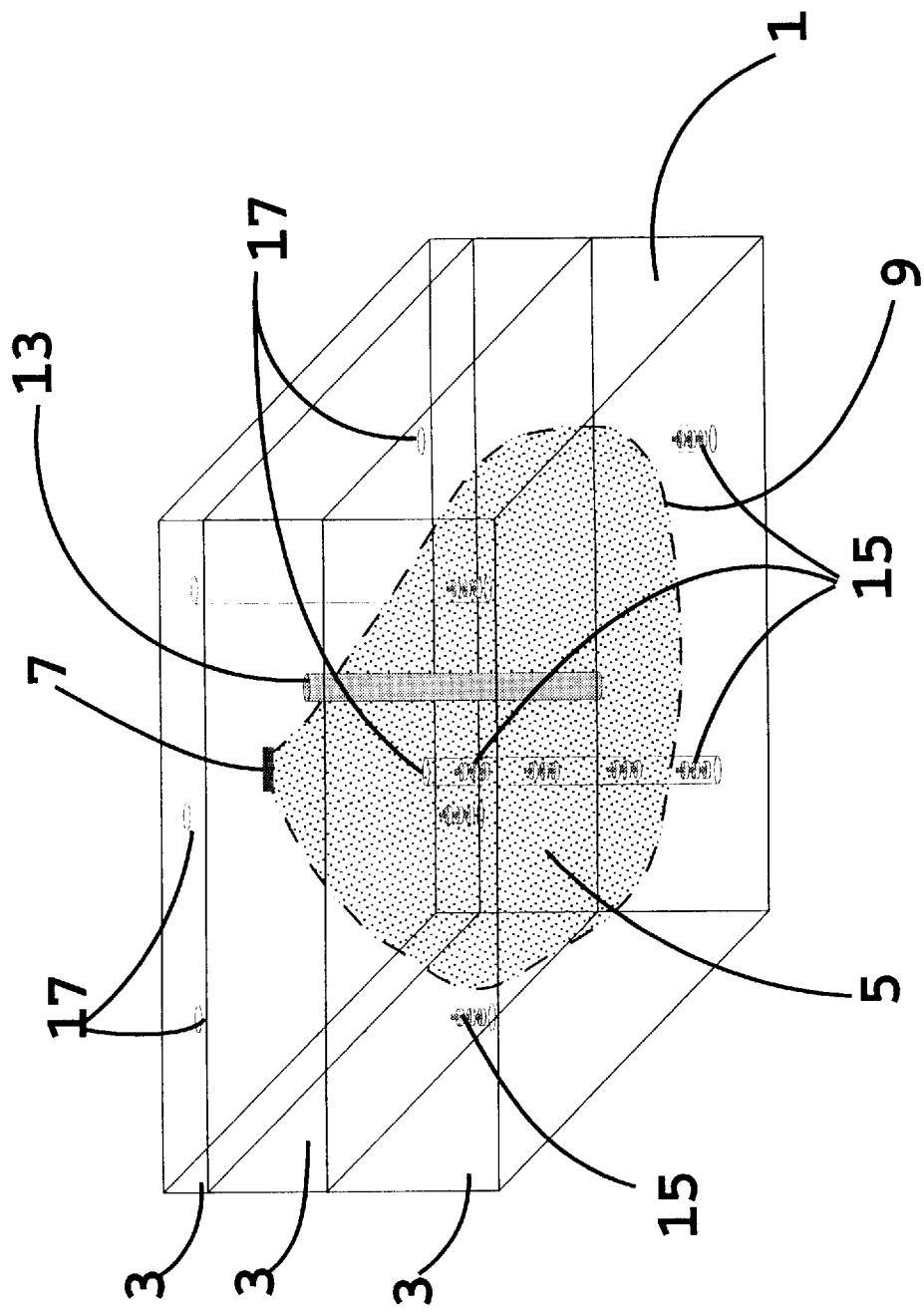
FIG. 1 is a trimetric view of a piece or cube of earth materials to be recovered and shows the recovery well and sonic broadcaster station in wells surrounding the Target Volume.

Turning now to the drawings, where like elements are identified with like numerals throughout the four figures, FIG. 1 shows a typical "cube" or sample of earth 1, that may range in size from less than a few meters on a side to many hundreds of meters covering many hectares, and transcend one or more Formations 3. This inventive method is relatively insensitive to specific fluid states and types, saturation conditions, or geological conditions of the Formations. For instance, this inventive method may be successfully utilized for gas and liquids, in unsaturated or saturated soils, unconsolidated soils, consolidated sediments, or bedrock, and the like.

The Target Volume, referred to as a plume in the field of environmental remediation 5 shown in dotted outline in FIG. 1, such as hydrocarbon fluid that may be spilled from a leaky tank (not shown), is located in cube 1. This contaminating material may have emanated from a ground spill point 7 and leaking downward, under processes such as gravity and surface tension, through the Formation. Usually plume 5 is variable in character, that is to say there are regions in it with no contamination, regions with only a little. contamination, and regions where earth is fully contaminated.

The first step in this inventive process is to estimate the volume of the recoverable material and locate its boundaries. This can be accomplished with a site survey by existing technologies, such as the use of test boreholes. Plume 5 is defined by a generally irregular boundary 9 that is continuous from ground point 7, down into and around the various Formations 3 and back to ground point 7. This step is necessary because the steps that follow include placement of wells in cube 1 both in and about the material to be recovered.

One or more recovery wells 13 is located strategically, usually within plume 5, for effective recovery of the materials. The size and depth of well 13 depends upon a number of factors that are also used in considering other well specifications. The overall goal is to maximize the recovery of materials within the earth from well 13 while minimizing the cost to do so. It is usually beneficial to drill well 13 inside the Target Volume 5 and to the lowest depth expected to receive the materials during the recovery process. However, other factors such as the existence of natural and man-made features (e.g., buildings, rivers, lakes, etc.) may dictate placing the well 13 nearby the Target Volume. As an overall rule, well 13 should be considered to be drilled at a depth and location which allows functional, efficient, and effective recovery of materials for a given site.

The next step is to establish multiple sources 15 of acoustical energy in an array about and spaced-apart from recovery well 13. Sources 15 may be surface mounted, such as shown in U.S. Pat. No. 4,417,621; may be surface mounted along with sunken piling members, such as shown in U.S. Pat. No. 4,280,558; or, may be lodged in an existing borehole or in boreholes or wells drilled for the very purpose of placing the sources adjacent the subterranean portion of plume 5, as shown in U.S. Pat. Nos. 5,184,678 and 3,790, 146. The central purpose of sources 15 is to be placed in an area wherein maximum energy can be transmitted into plume 5 and minimizing the attenuating effects of the earth itself. As shown in FIG. 1, a plurality of broadcast wells 17 are located about plume 5 into which sources 15 are placed, at different locations from top to bottom and at various levels therebetween, to form broadcast stations 19 from which to emit radiation into plume 5.

Sources 15 may include a sonic driver, electrical transducers, mechanical/hydraulic transducers, combustion driven sonic sources, and any other type of sonic sources that have sufficient power and phase control. Additionally, a plurality of sources 15 may be arranged in any particular well 17 to allow for sufficient control of focussing through phase control in the vertical direction.

The frequencies over which sources 15 operate lie in the infrasonic to ultrasonic range; this covers a range of from about 2 Hertz to about 200 KHertz. In addition, the waveform of the frequencies range from pulse waves to square waves to sinusoidal waves. Further, the waves may be broadcast using antennae that produce a radial beam as well as a linear beam. Specific frequencies, waveforms and the radial/linear character of the emissions are dependent in large part upon the type of earth being remediated, the type of materials being recovered as well as the geometry of plume 5. To achieve a tight focus, it is preferred that each source 15 of acoustical energy emit the same waveform of energy at the same frequency of every other source 15. In this way, better control over reinforcing the waves is obtained. However, in some cases, the said sources 15 can be set to different waveforms and frequencies to achieve more desirable excitation and sweep patterns over the Target Volume. Said sources 15 are thereafter energized, with electricity, or whatever other power sources are desired, to have them begin emitting beams of energy.

Figure 2:
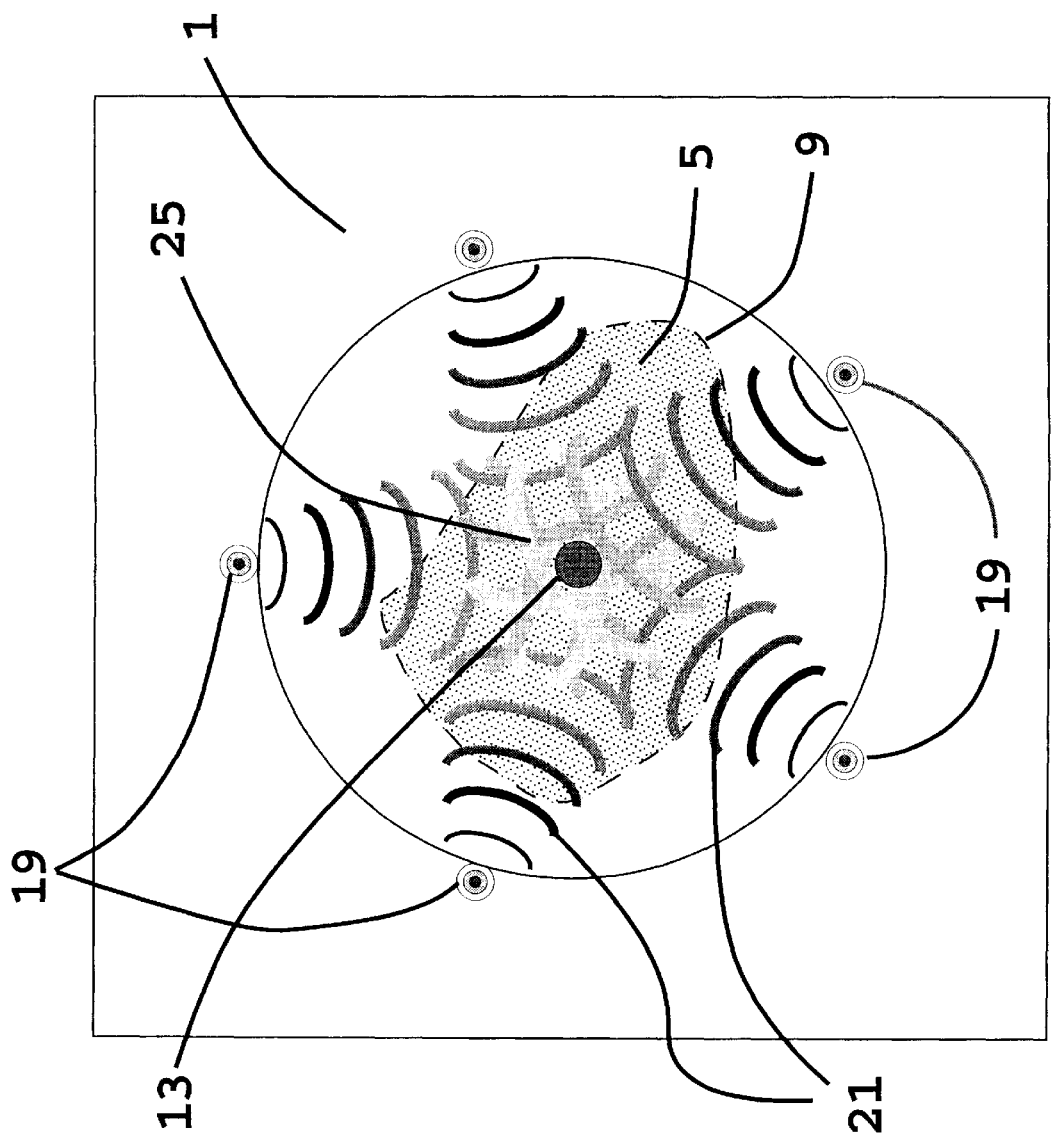
FIG. 2 is a top plan view of the cube of earth shown in FIG. 1 wherein the broadcasting stations are shown to be emitting linear or radial acoustic/sonic radiation from each station that are phase controlled from each station.

FIG. 2 shows a simplified cross-section in which each broadcast station 19 emits radial beam 21 of energy, aimed into plume 5 so that each said beam 21 intersects with other like beams 21 of energy from other broadcast stations 19 to form reinforced beams that culminate in radially-shaped peaks 25 of intense energy inside plume 5. The specific waveform, its energy level, phase, duration and the direction of emission may be monitored, to insure that beam reinforcement takes place, and may be controlled by antenna direction to insure that peaks 25 are formed within plume 5. In addition, it is clearly desired that peaks 25 travel in unison toward recovery well 13 so as to move the recoverable materials in that direction.

Figure 3:
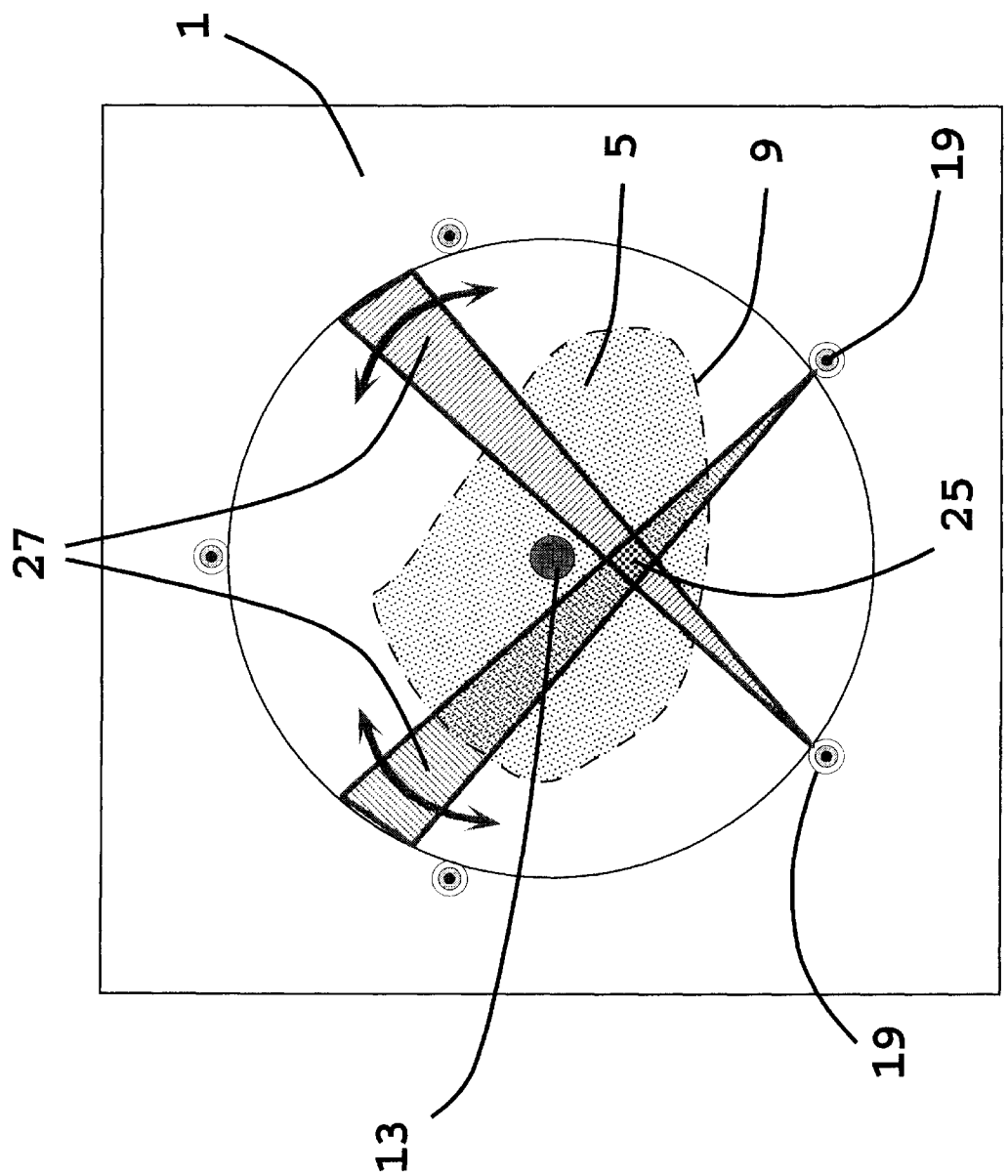
FIG. 3 is another top plan view of the cube of earth shown in FIG. 1 wherein the broadcasting stations are shown to be emitting lines of linear radiation from each station for sweeping from side to side; and, FIG. 4 is another top plan view of the cube of ground shown in FIG. 1 wherein the broadcasting stations are shown to be emitting combination of lines of radial and linear radiation.

FIG. 3 shows each broadcast station 19 emitting a linear beam 27 of energy that is swept from one side of plume 5 to the other so that said beams intersect with other like beams 27 of energy from other broadcast stations 19 to form reinforced beams that culminate in peaks 25 of intense energy that is needed to release the materials to be recovered from its retentive position in the Formation within plume 5. The specific waveform, its energy level, phase, duration, and the direction of emission may be monitored, to insure that beam reinforcement takes place, and may be controlled by antenna direction, or sweeping the antenna from side-to-side in plume 5, to insure that peaks 25 are formed within plume 5. In addition, it is clearly desired that peaks 25 sweep back and forth throughout plume 5 to urge the recoverable materials toward recovery well 13.

Figure 4:
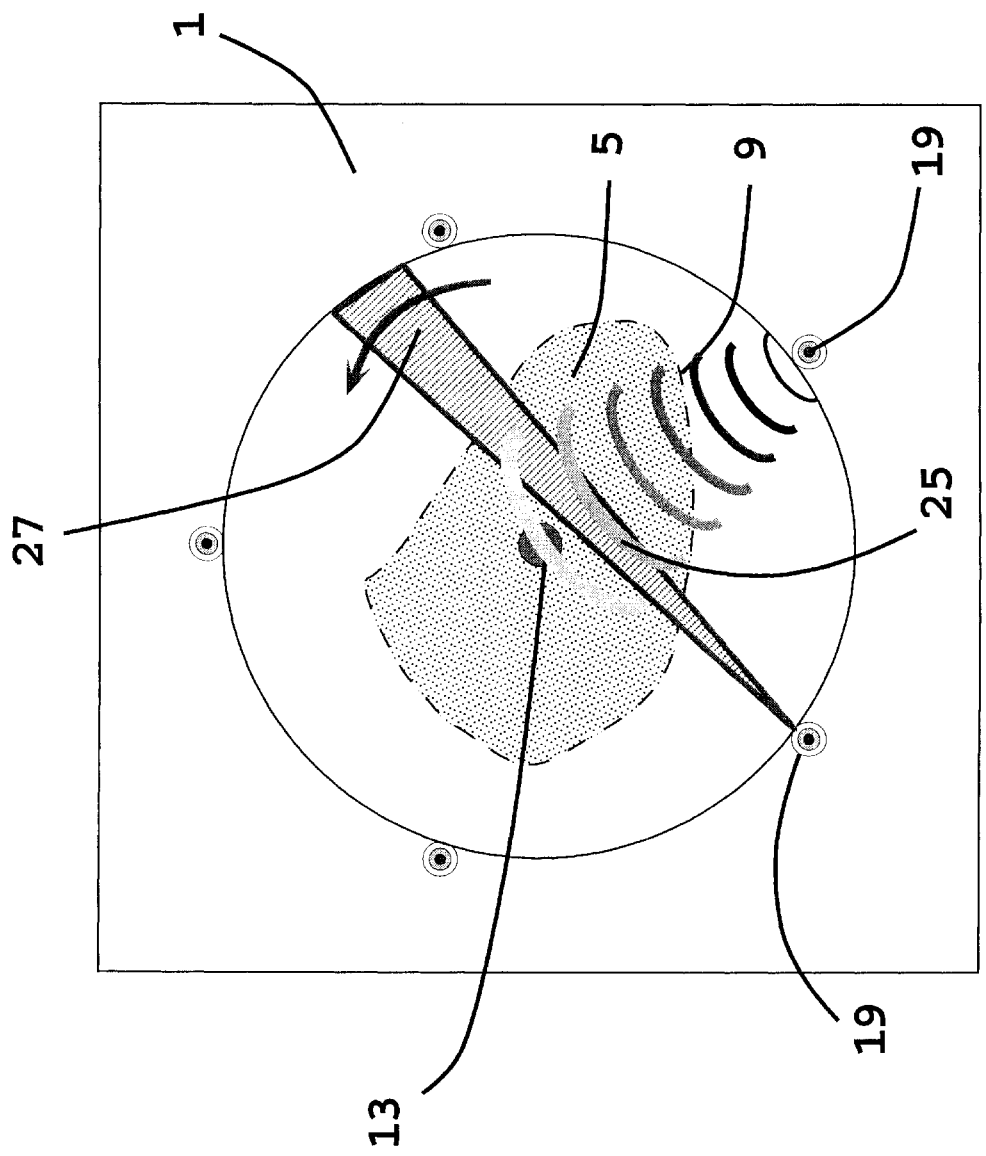

FIG. 4 shows a combination of events where at least one, but preferably some, broadcast stations 19 emit radial beams 21 of energy, aimed into plume 5, and other broadcast stations 19 emit. linear beams 27 of energy, also aimed into plume 5 and swept there across, so that said beams intersect to form reinforced beams that culminate in radially-shaped peaks 25 of intense energy inside plume 5. The specific waveforms, their energy levels and the directions of emissions may be monitored, to insure that beam reinforcement takes place, and may be controlled by antenna directions to insure that peaks 25 are formed within plume 5. In addition, it is clearly desired that peaks 25 travel in unison toward recovery well 13 so as to move the recoverable materials in that direction.

In addition, the broadcast may be on a continuous level, such as over a period of hours to days or be short in duration such as for a period of milliseconds to seconds.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the way to achieve substantially the same result are within the scope of this invention.

What is claimed is:

1. A method of enhancing the retrieval of recoverable materials including gas, liquid, and/or solid-phase natural and manmade materials including organic, inorganic, radio nuclides and metal contaminants, water, oil, mineral solutions and natural gas, from an identified region within the earth comprising the steps of:
   a) determining the size of the region containing said recoverable materials;
   b) sinking at least one recovery well in the region to recover the materials of interest;
   c) locating a plurality of broadcast wells about the region to form broadcast stations;
   d) establishing multiple sources of acoustical energy in an array about and spaced-apart from said recovery well under the surface of the earth in said broadcast wells;
   e) directing an acoustic excitation of identical frequencies from said sources into the region of the materials to be recovered, said excitation in the form of controllable waveforms; and,
   f) controlling the phase, frequency, power, and duration of said waveforms from said sources to increase the intensity of acoustical excitation in the region of the materials to be recovered to change the recovery of the materials.

2. The method of claim 1 wherein the step of directing an acoustical excitation of identical frequencies from said sources into the region of the materials to be recovered, includes the steps of:
   a) generating linear beams of waveform energy from said array of sources;
   b) directing said linear beams toward the region within the earth where the materials to be recovered reside; and,
   c) sweeping said beams back and forth, from one side of the region to the other side, so that said linear beams intersect within the region to create areas of desired acoustical excitation.

3. The method of claim 1 wherein said waveform is sinusoidal.

4. The method of claim 1 wherein said waveform is square.

5. The method of claim 1 wherein said waveform is pulsed.

6. The method of claim 1 wherein said waveform is varied in amplitude.

7. A method of enhancing the retrieval of recoverable materials including gas, liquid, and/or solid-phase natural and man-made materials including organic, inorganic, radio nuclides and metal contaminants, water, oil, mineral solutions and natural gas, from an identified region within the earth comprising the steps of:
   a) determining the size of the region containing the recoverable materials;
   b) sinking at least one recovery well in the region to recover the materials of interest;
   c) establishing multiple sources of acoustical energy in an array about said well and spaced-apart therefrom at the surface of the earth;
   d) directing an acoustic excitation of identical frequencies from said sources into the region of the materials to be recovered, said excitation in the form of controllable waveforms and including the steps of:
      i) generating linear beams of waveform energy from said array of sources;
      ii) directing said linear beams toward the region within the earth where the materials to be recovered reside; and,
      iii) sweeping said beams back and forth, from one side of the region to the other side, so that said linear beams intersect within the region to create areas of desired acoustical excitation; and, e) controlling the phase, frequency, power, and duration of said waveforms from said sources to increase the intensity of acoustical excitation in the region of the materials to be recovered to enhance the recovery of the materials.

8. A method of enhancing the retrieval of recoverable materials including gas, liquid, and/or solid-phase natural and man-made materials including organic, inorganic, radio nuclides and metal contaminants, water, oil, mineral solutions and natural gas, from an identified region within the earth comprising the steps of:

a) determining the size of the region containing the recoverable materials;

b) sinking at least one recovery well in the region to recover the materials of interest;

c) establishing multiple sources of acoustical energy in an array about said well and spaced-apart therefrom at the surface of the earth;

d) directing an acoustic excitation of identical frequencies from said sources into the region of the materials to be recovered, said excitation in the form of controllable waveforms and including the steps of:
  i) generating radial and linear beams of waveform energy from said array of sources;
  ii) directing said radial and linear beams toward the region within the earth where the materials to be recovered reside; and,
  iii) sweeping said linear beam back and forth, from one side of the region to the other side, so that said radial and linear beams intersect within the region to create areas of desired acoustical excitation; and, e) controlling the phase, frequency, power, and duration of said waveforms from said sources to increase the intensity of acoustical excitation in the region of the materials to be recovered to enhance the recovery of the materials.

9. A method of enhancing the retrieval of recoverable materials including gas, liquid, and/or solid-phase natural and man-made materials including organic, inorganic, radio nuclides and metal contaminants, water, oil, mineral solutions and natural gas, from an identified region within the earth comprising the steps of:

a) determining the size of the region containing said recoverable materials;

b) sinking at least one recovery well in the region to recover the materials of interest;

c) locating a plurality of broadcast wells about the region to form broadcast stations;

d) establishing multiple sources of acoustical energy in an array about and spaced-apart from said recovery well under the surface of the earth in said broadcast wells;

e) directing an acoustic excitation of identical frequencies from said sources into the region of the materials to be recovered, said excitation in the form of controllable waveforms includes the steps of:
  i) generating radial beams of waveform energy from said array of sources; and,
  ii) directing said radial beams toward the region within the earth where the materials to be recovered reside so that said radial beams intersect within the region to create areas of desired acoustical excitation; and, f) controlling the phase, frequency, power, and duration of said waveforms from said sources to increase the intensity of acoustical excitation in the region of the materials to be recovered to change the recovery of the materials.

10. A method of enhancing the retrieval of recoverable materials including gas, liquid, and/or solid-phase natural and man-made materials including organic, inorganic, radio nuclides and metal contaminants, water, oil, mineral solutions and natural gas, from an identified region within the earth comprising the steps of:

a) determining the size of the region containing said recoverable materials;

b) sinking at least one recovery well in the region to recover the materials of interest;

c) locating a plurality of broadcast wells about the region to form broadcast stations;

d) establishing multiple sources of acoustical energy in an array about and spaced-apart from said recovery well under the surface of the earth in said broadcast wells;

e) directing an acoustic excitation of identical frequencies from said sources into the region of the materials to be recovered, said excitation in the form of controllable waveforms includes the steps of:
  i) generating radial and linear beams of waveform energy from said array of sources; and,
  ii) directing said radial and linear beams toward the region within the earth where the materials to be recovered reside;
  iii) sweeping said linear beams back and forth, so that said radial and linear beams intersect within the region to create areas of desired acoustical excitation; and, f) controlling the phase, frequency, power, and duration of said waveforms from said sources to increase the intensity of acoustical excitation in the region of the materials to be recovered to change the recovery of the materials.

11. A method of enhancing the retrieval of recoverable materials including gas, liquid, and/or solid-phase natural and man-made materials including organic, inorganic, radio nuclides and metal contaminants, water, oil, mineral solutions and natural gas, from an identified region within the earth comprising the steps of:

a) determining the size of the region containing said recoverable materials;

b) sinking at least one recovery well in the region to recover the materials of interest;

c) locating a plurality of broadcast wells about the region to form broadcast stations;

d) establishing multiple sources of acoustical energy in an array about and spaced-apart from said recovery well under the surface of the earth in said broadcast wells;

e) generating linear beams of waveform energy of different frequencies and shapes where the different frequencies and shapes are identical from each said source at each instant. and directing said waveform energy into the region of the materials to be recovered; and, f) controlling the phase, frequency, power, and duration of said waveforms from said sources to increase the intensity of acoustical excitation in the region of the materials to be recovered to change the recovery of the materials.

12. A method of enhancing the retrieval of recoverable materials including gas, liquid, and/or solid-phase natural and man-made materials including organic, inorganic radio nuclides and metal contaminants, water, oil, mineral solutions and natural gas, from an identified region within the earth comprising the steps of:

a) determining the size of the region containing said recoverable materials;
b) sinking at least one recovery well in the region to recover the materials of interest;
c) establishing multiple sources of acoustical energy in an array about said well and spaced-apart therefrom at the surface of the earth and under the surface of the earth;
d) directing an acoustic excitation of identical frequencies from said sources into the region of the materials to be recovered, said excitation in the form of controllable waveforms including the steps of:
   i) generating linear beams of waveform energy from said array of sources;
   ii) directing said linear beams toward the region within the earth where the materials to be recovered reside; and,
   iii) sweeping said beams back and forth, from one side of the region to the other side, so that said linear beams intersect within the region to create areas of desired acoustical excitation; and,
e) controlling the phase, frequency, power, ad duration of said waveforms from said sources to increase the intensity of acoustical excitation in the region of the materials to be recovered to enhance the recovery of the materials;.

13. A method of enhancing the retrieval of recoverable materials including gas, liquid, and/or solid-phase natural and man-made materials including organic, inorganic, radio nuclides and metal contaminants, water, oil, mineral solutions and natural gas, from an identified region within the earth comprising the steps of:

a) determining the size of the region containing said recoverable materials;
b) sinking at least one recovery well in the region to recover the materials of interest;
c) establishing multiple sources of acoustical energy in an array about said well and spaced-apart therefrom at the surface of the earth and under the surface of the earth;
d) directing an acoustic excitation of identical frequencies from said sources into the region of the materials to be recovered, said excitation in the form of controllable waveforms including the steps of:
   i) generating linear and radial beams of waveform energy from said array of sources;
   ii) directing said linear and radial beams toward the region within the earth where the materials to be recovered reside; and,
   iii) sweeping said linear beams back and forth, from one side of the region to the other side, so that said linear and radial beams intersect within the region to create areas of desired acoustical excitation; and,
e) controlling the phase, frequency, power, and duration of said waveforms from said sources to increase the intensity of acoustical excitation in the region of the materials to be recovered to enhance the recovery of the materials.

* * * * *